United States Patent

[11] 3,560,755

[72] Inventors Roger Blaise
Massy;
Gerard Peres, Villepreux, France
[21] Appl. No. 812,169
[22] Filed Apr. 1, 1969
[45] Patented Feb. 2, 1971
[73] Assignee Campagnie Generale D'Electricite
Paris, France
a corporation of France
[32] Priority Mar. 29, 1968
[33] France
[31] 146,583

[54] HIGH SENSITIVITY RADIATION DETECTOR
15 Claims, 7 Drawing Figs.

[52] U.S. Cl. .......... 250/214, 250/211, 317/235, 307/311
[51] Int. Cl. .......... H01l 15/00
[50] Field of Search .......... 250/211J; 317/235.27, 235.29; 307/310, 311, 117; 250/214

[56] References Cited
UNITED STATES PATENTS

| | | | |
|---|---|---|---|
| 2,846,592 | 8/1958 | Rutz | 250/211 |
| 3,268,739 | 8/1966 | Dickson, Jr. | 317/235X |
| 3,430,106 | 2/1969 | McDowell | 307/311X |
| 3,452,206 | 6/1969 | Biet et al. | 317/235X |
| 3,463,928 | 8/1969 | Murphy | 307/311X |
| 3,466,448 | 9/1969 | De Vaux | 250/211 |

*Primary Examiner*—Walter Stolwein
*Attorney*—Craig, Antonelli, Stewart and Hill

ABSTRACT: A photodetector diode operating with avalanche characteristics is energized through a regulator which, when the temperature of this diode varies, compensates for this variation by acting upon the energizing voltage to the diode. A reference diode having electrical characteristics equivalent to those of the detector diode and being thermally coupled to this detector diode furnishes for this purpose a reference signal to which the energizing voltage of the detector diode is coordinated by means of a differential amplifier and by means of the regulator.

HIGH SENSITIVITY RADIATION DETECTOR

The present invention is concerned with the detection of radiation, for example luminous radiation, with a high degree of sensitivity with the aid of a photodiode which is inversely biased and adapted to operate with avalanche characteristics.

For the purpose of detecting radiation whose level of intensity is within the range of detectability of a conventional semiconductor photocell it is known to resort to the used photomultiplier tube, provided the length of the wave to be detected permits such use. However, it is also known that the use of the multiplier tube involves considerable inconveniences compared to the utilization of the semiconductor photodiode, since at least the related electronics thereof are complex and cumbersome. It is equally known that in the sensitivity range suitable for optical radiation of low level, a semiconductor component, such as the photodiode operating with an avalanche characteristic, can compete with the photomultiplier tube. As a matter of fact, with operation in the avalanche portion of its characteristic, the photodiode has a very high internal multiplication factor.

For the purpose of receiving the characteristics of photodiodes, FIG. 1 of the accompanying drawings provides the inverse current voltage characteristics $i=f(v)$ thereof for any given silicon photodiode operating in the dark at 1; for a conventional photodiode under illumination at 2; and for a photodiode operating with avalanche characteristics under illumination at 3. The internal multiplication factor M of a photodiode is defined as the ratio of the signal intensity under illumination I for a given bias voltage V to the value of the signal intensity under illumination for a fixed bias voltage $V_o$ chosen within the range where this current retains a constant value $i$ taken as a reference, these two signal intensities being defined after deduction of the darkness current:

$$M=\frac{I}{i} \quad (1)$$

This multiplication factor M increases with increase in the bias voltage on the diode and becomes theoretically infinite when this bias voltage reaches the value of the breakdown voltage $V_B$. In order to benefit from a high multiplication factor, one thus chooses a point of operation for the diode close to the breakdown voltage $V_B$. But since the variation of the multiplication factor becomes more and more rapid in the immediate vicinity of this breakdown voltage, the preservation of a constant value of this coefficient M requires a preservation of the bias voltage with an increased precision.

Furthermore, during the course of operation, the temperature of the photodiode can undergo a variation. Such a variation, however, even if small, results in a variation in the breakdown voltage and, as a consequence, a variation of the value of the multiplication coefficient M, which is undesirable. The result thereof is a considerable difficulty of maintaining constantly a high multiplication coefficient when photodiodes are employed which operate with an avalanche characteristic.

It is further known that, when it is desired to avoid the inconveniences resulting from variation of the output signal of a semiconductor component in the presence of a temperature variation, use is made of a reference semiconductor element whose electrical characteristics vary as a function of the temperature in the same manner as the electrical characteristics of the semiconductor element, the conditions of use of which are intended to be improved. The compensation is then achieved by comparison of the output signals of the two semiconductor elements, so that compensation does not result from a modification of the operating conditions of the element to be controlled, but from a treatment or adjustment of the output signal of this element. In the case of photodiodes operating with avalanche characteristics, such an expedient does not insure in a simple manner the approximate constancy of the multiplication coefficient previously mentioned.

The present invention makes it possible to remedy these drawbacks. It is directed to and concerned with a radiation detector comprising a photosensitive detector diode inversely biased electrically and adapted to operate with avalanche characteristics when it receives the radiation to be detected, this detector comprises moreover a reference diode thermally coupled to this detector diode and having a thermal sensitivity close to that of the detector diode in question but is not affected by the radiation to be detected. This detector is characterized in that an output signal of the reference diode is applied to a control member for controlling the electrical energizing voltage for the detector diode in a sense appropriate for compensating for the possible variations as far as the output signal of this detector diode is concerned.

The aforementioned control circuit consists advantageously of a regulator which controls the energizing voltage of the aforementioned detector diode and is controlled in turn by a comparator furnishing an output signal which is proportional to the voltages that are present on the two input terminals thereof, one of these terminals receiving the output signal of the aforesaid reference diode, and the other the energizing voltage of the aforesaid detector diode, in such a manner as to necessarily cause this energizing voltage to be equal to this output signal.

The aforementioned comparator advantageously comprises a differential amplifier. The aforementioned reference diode is advantageously of the same type as the aforementioned detector diode and is likewise inversely biased.

The aforementioned reference diode is advantageously of the same type as the aforementioned detector diode and is likewise inversely biased.

The aforementioned reference diode is advantageously supplied with current essentially independently of the temperature, and the aforementioned signal thereof is constituted of the difference in potential between that of the terminals thereof which is connected to the current source and ground to which the other terminal thereof is connected. The two aforementioned diodes may be connected together to ground. The aforementioned reference diode is advantageously energized by means of a variable resistance from the same source of direct current as the aforementioned detector diode.

The aforementioned detector diode may be advantageously connected in series with a modulator, and the two aforementioned diodes may be advantageously provided on the same semiconductor body. The dimensions of the aforementioned reference diode are advantageously greater than those of the aforementioned detector diode.

In order to facilitate the understanding of the present invention as well as the advantages which are afforded by the use thereof, a description of one of the embodiments will now be presented by way of example and without limitation in conjunction with the accompanying drawings, wherein FIG. 1 illustrates the inverse current-voltage characteristics of a photodiode under various conditions of operation;

Figure 1:
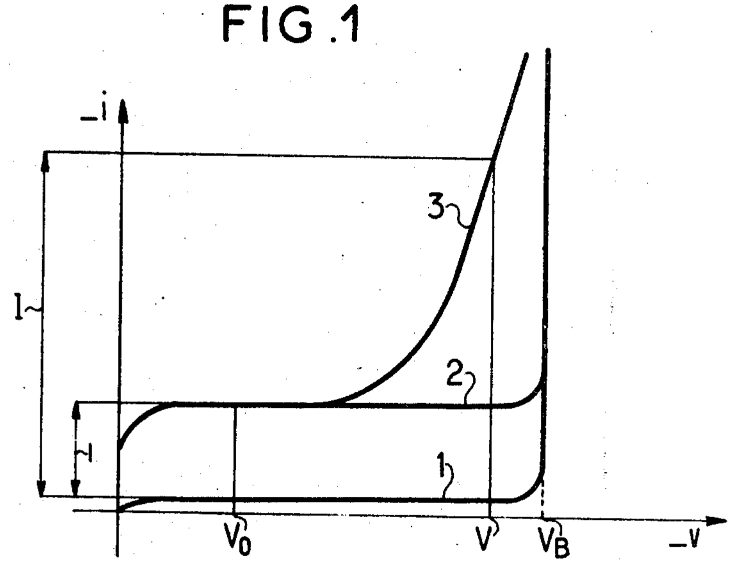
Figure 2:
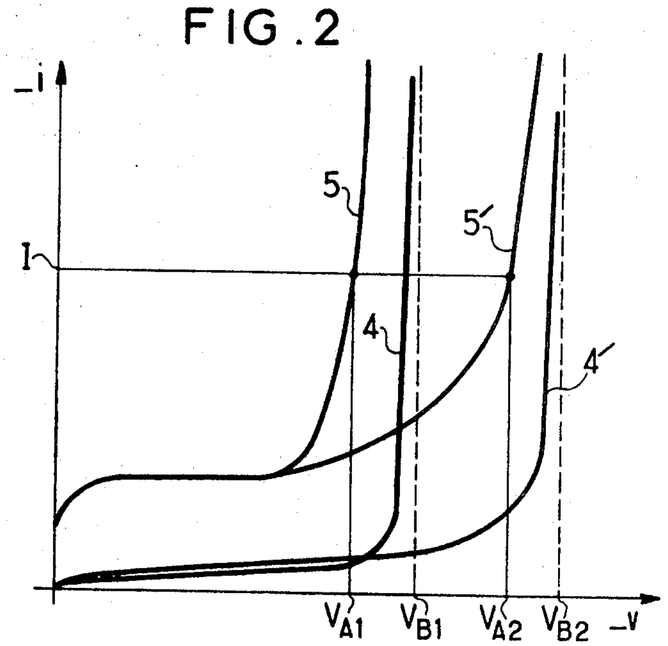
FIG. 2 illustrates the characteristics of the diodes used according to the temperature.

FIG. 2 shows the variations in the darkness characteristic 4, on the one hand, and the illumination characteristic 5, on the other hand, for a photodiode operating with avalanche characteristics upon the occurrence of a temperature elevation involving a variation of the breakdown voltage. The breakdown voltage which is originally $V_B$ becomes $V_{B2}$ while the darkness characteristic 4 passes or changes to 4′ and the illumination characteristic 5 changes to 5′. It is well-known that the temperature coefficient of the breakdown voltage in an avalanche device is positive.

If it is desired to maintain a constant multiplication factor in a photodiode, for the same illumination, it is necessary to preserve a constant intensity output signal I; this has the result of changing the value of the biasing voltage. Originally, an output signal having the intensity I is obtained for a biasing voltage $V_{A1}$ (curve 5, FIG. 2). In order to obtain the same output signal after a temperature increase, it is necessary to utilize a biasing voltage $V_{A2}$ according to the curve 5'. The ratio of the voltages $V_{A1}/V_{A2}$ is equal, in a first approximation, to the ratio $V_{A2}/V_{B2}$. The operating condition at a constant multiplication factor $M = C^{te}$ may thus be expressed, in a first approximation, by the equivalent condition $$\frac{\text{Biasing voltage}}{\text{Breakdown voltage}} = C^{te}$$

This is a condition which is practically little different from the latter which the invention allows to satisfy.

The detector according to the present invention comprises two semiconductor diodes operating in the avalanche mode which have the same temperature coefficient and closely related electrical characteristics. When subjected to radiation, the detector diode operates as photodiode in the avalanche mode. The reference diode being thermally coupled to the former and not being subjected to radiation operates as a control element of a control circuit. This circuit is provided with means for approximately returning at any instant the operating point of the detector diode to the value which is necessary for maintaining the constancy of the multiplication coefficient, whatever may be the temperature variation and whatever may be the predetermined value of this multiplication coefficient.

The means being provided for the control or regulation of the operating point of the detector diode comprise a regulating stage, intermediate amplification stages preceded by a comparator (preferably with a differential amplifier) effecting control over the output voltage applied to the detector diode by the voltage present at the terminals of the reference diode having an identical temperature coefficient; the precision of the regulation being a function of the gain of the control circuit.

The value of the multiplication coefficient may be adjusted with precision by means of proper choice of the operating current of the reference diode which, thanks to the judicious use of the dynamic resistance of the latter, permits a very exact regulation of the energizing voltage of the detector diode.

The unit consisting of the two diodes which have the same temperature coefficient and similar electrical characteristics may be advantageously provided in a monolithic integrated form. The device as proposed by the present invention may also be made in the form of matrices of photosensitive elements being thermally coupled two by two.

The two aforementioned diodes may be electrically insulated from each other, or also with respect to a common substratum, and the latter is achieved by making use of the known technologies such as epitaxis on the common insulating substratum, insulated barriers and diffusion layers. The photosensitive element may be a semiconductor material belonging to the group including germanium, silicon, or also the group known under the designation of AIII/BV, such as indium antimonide, indium arsenide, and gallium arsenide. These materials allow for the detection of radiation which the photomultipliers cannot detect by reason of the spectral sensitivity limits thereof. The present invention may be applied to any diode operating in the avalanche mode having the structure PN, PIN, PπPN,..

The application of the biasing voltage to the photodiode may be made in a noncontinuous fashion in the form of pulses, for example, which involves a secondary modification of the circuit in accordance with the invention.

Figure 3:
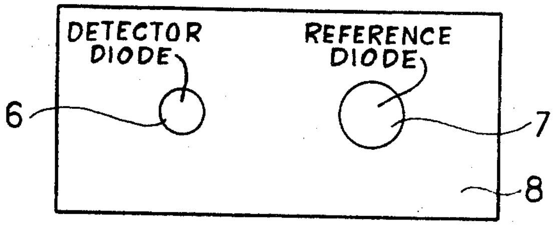
FIG. 3 is a top view of a silicon wafer carrying two diodes according to the present invention.
Figure 4:
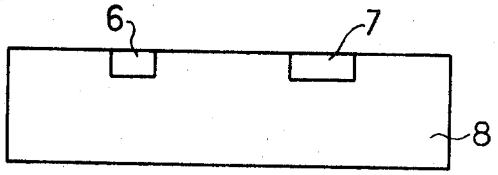
FIG. 4 is a cross-sectional view of the wafer supporting the two diodes shown in FIG. 3.

In a preferred embodiment according to the present invention, two diodes of silicon, for example, are provided in monolithic integrated form. FIG. 3 is a top view of the small P-type silicon wafer carrying the diodes 6 and 7; the base material is represented at 8. FIG. 4 is a cross-sectional view of the integrated structure shown in FIG. 3; the same reference symbols identify corresponding elements in these FIGS. The diodes 6 and 7, whose dimensions may be nonequal, are obtained simultaneously according to methods known per se for forming semiconductor devices, such as diffusion, epitaxial growth, etc.

As is apparent from FIG. 4, provision of junctions in the device according to the conventional planar technique may be utilized. From the surface of the semiconductor zones which are designed for the respective locations of the diodes 6 and 7, an impurity N is diffused with a superficial amount of concentration such that it brings about the N-type conduction up to a predetermined depth in the P-type material 8 in a manner such as to form a junction with the base material.

The simultaneous manufacture of the two diodes assures the identity of the temperature coefficient thereof and the similarity of their electrical characteristics.

In the course of operation, the detector diode 6 is subjected to radiation and will operate as photodiode with avalanche characteristics; whereas, the reference diode 7 is protected from radiation by any means known per se in the art, such as by exclusive focusing on the photosensitive diode 6, provision of a protective screen in front of the diode 7, etc.

Figure 5:
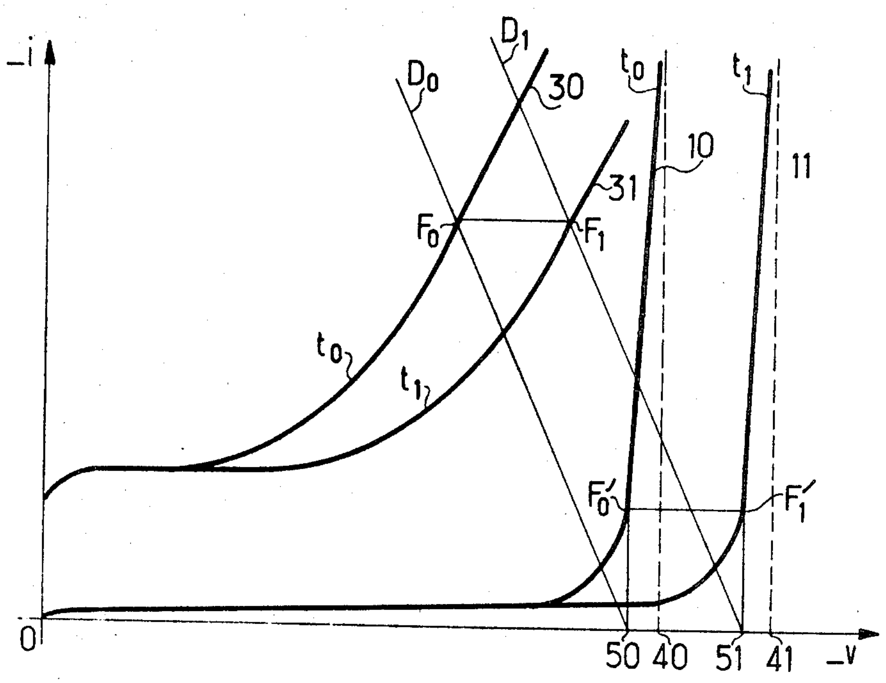
FIG. 5 illustrates the dynamic characteristics of the aforementioned diodes in operation.

FIG. 5 illustrates two inverse characteristics of the photodiode 6 when subjected to radiation; the first one 30 corresponds to a temperature $t_o$; the second one 31 corresponds to a temperature $t_1$ ($t_1 > t_o$). FIG. 5 also provides two characteristic curves relative to the diode 7 which is not subjected to radiation, one curve 10 for the temperature $t_o$ and the other curve 11 for the temperature $t_1$. Moreover, an operating line $D_o$ is shown in FIG. 5; its origin 50 on the axis of the voltages represents the voltage of the source of bias voltage and its inclination with respect to the axis of the intensities represents the value of load resistance connected in series with the photodiode 6. This line $D_o$ determines the point of operation $F_o$ of the diode at the temperature $t_o$ for the biasing voltage represented by the point 50 and designated as V (50). To it corresponds a point of operation $F'_o$ on the curve 10 for the reference diode 7 which is not subjected to radiation.

In FIG. 5, the point 40 represents the breakdown voltage, which is the same for both the diodes 6 and 7 at the temperature $t_o$, and the point 41 represents the breakdown voltage of these diodes at the temperature $t_1$.

The condition of retaining or preserving the multiplication factor as explained previously is obtained approximately, when the temperature passes from $t_o$ to $t_1$ b y translation of the point of operation $F_o$ to $F_1$ on the characteristic 31 (corresponding to $t_1$) parallel to the axis of the voltages. By virtue of the statements made hereinabove, in a first approximation, the ratio of the bias voltage of the reference diode 7 to the breakdown voltage thereof remains constant, i.e., $$\frac{V(50)}{V(40)} = \frac{V(51)}{V(41)}$$

whereas, if a strict constancy of the intensity I traversing the detector diode 6 were obtained, the following equation would result:

$$\frac{V(F0)}{V(40)} = \frac{V(F1)}{V(41)}$$

The latter equation is approximately obtained according to the present invention by a translation of the straight operating line $D_o$ into $D_1$, the straight line $D_1$ being parallel to the straight line $D_o$. This straight line is chosen to be such that the point of operation $F'_1$ of the reference straight line $D_o$ on the curve 11 corresponds to the same current intensity as the point $F'_o$.

Figure 6:
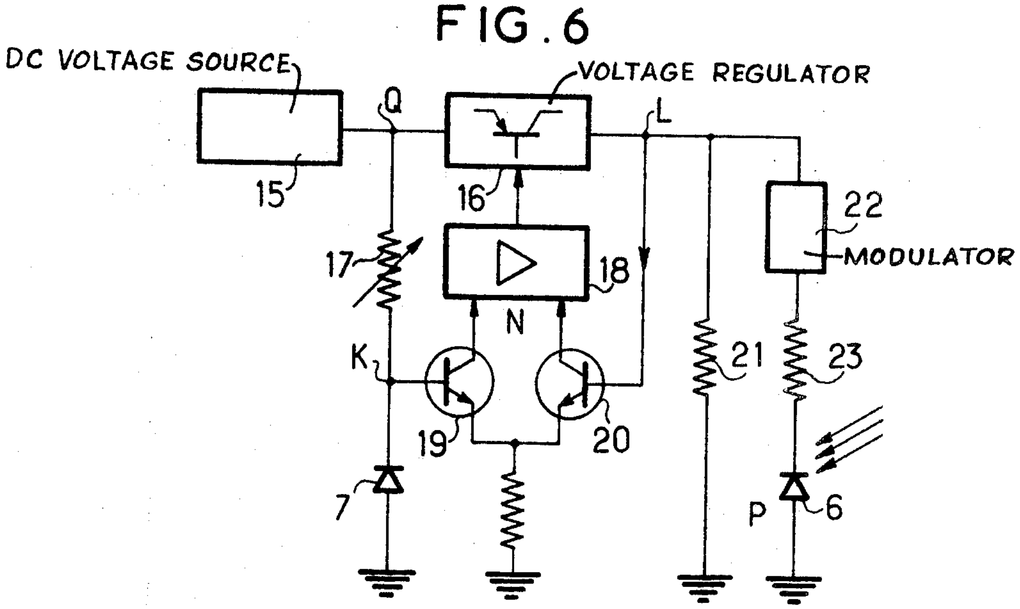
FIG. 6 illustrates the schematic diagram of a circuit according to the present invention.

FIG. 6 illustrates the circuit which utilizes the signal issued from the second diode 7, which is not subjected to radiation, as a control signal for displacing the straight operating line of the diode from $D_o$ to $D_1$ when the temperature passes from $t_o$ to $t_1$. This permits the approximate return at any instant of the operating point of the first photosensitive diode 6 to the value which is required for the preservation of a constant multiplication factor.

This circuit comprises a source of direct current voltage 15, which furnishes the biasing voltage of the detector diode 6, on the one hand, by means of a series regulator element 16, and on the other hand, furnishes the biasing voltage to the reference diode 7 by means of a variable resistance 17. The series regulator element 16 may consist of a transistor conducting through a resistance 21 and controlled by an amplifier 18 which in turn receives the output of a differential comparator system consisting of the two transistors 19 and 20. This arrangement allows for the elimination of the deviations peculiar to the comparator stage as a function of the temperature.

The voltages which are present at the points K and L are compared in the comparator stage 19—20. The resultant error signal is amplified in amplifier 18 and serves for controlling the regulator stage 19—20. The resultant error signal is amplified in amplifier 18 and serves for controlling the regulator stage 16 which is interposed between the points Q and L. The gain of the comparator-amplifier combination and regulator unit must be elevated in order to reduce the error voltage if it is desired to obtain a precise regulation.

The load resistance of the detector diode 6 whose value determines the inclination of the straight lines $D_o$ and $D_1$ in FIG. 5 is represented at 23.

Furthermore, in case it is desired that the energization of the diode 6 be pulsated or modulated, a modulator 22 may be connected in series with this diode. This modulator may operate either as a circuit breaker being periodic or not, for the pulsating system. It may use a magnetic connection, for example, if it is desired that a sinusoidal modulation be obtained.

The darkness current of the diode 7 (which circulates in the branch Q K) may be regulated by the resistance 17. This current may be higher than that which circulates in the diode 6 in an order of magnitude of 10, 100 or more.

According to a particular embodiment and application of the present invention, it is advantageous for the purpose of increasing the admissible current in the reference diode 7 (so as to improve the precision of regulation) to make the latter with geometrical dimensions greater than those of the diode 6 for operation at a constant current density.

Figure 7:
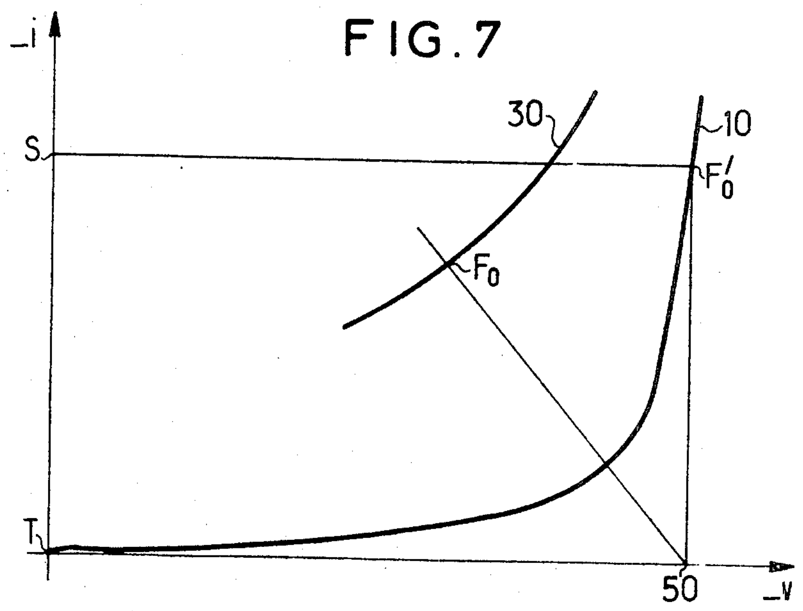
FIG. 7 illustrates the possibility of adjusting the position of the operating point of the photosensitive element in accordance with this invention.

An appreciable advantage with respect to the regulation of the operating point of the photosensitive diode according to the present invention resides in the fact that this point may be adjusted in a precise fashion by reason of the choice of the operating point of the reference diode, as has been shown in FIG. 7.

The point of operation of the diode 7, such as $F'_o$ in FIG. 6, may be chosen by assuming for example a value of the darkness current, such as ST in FIG. 7. The point $F'_o$ is then determined, and may be advantageously chosen, in the quasi-vertical portion of the characteristic 10 of the reference diode. This determines location of the point $F_o$ on the characteristic 30, i.e., the operating point of the photosensitive diode 6. This operating point may be maintained at any moment at the value which is required to obtain a constant multiplication factor, as has been set forth hereinabove. It is very advantageous to be in a position to adjust within a very limited tolerance the point of operation of the photosensitive element 6, and this is obtained very easily with the choice of the operating point according to FIG. 7.

As a matter of fact, for an involuntary variation of the darkness current value S T there corresponds a variation of the position of $F'_o$ on the curve 10, which involves only a very small displacement of the point 50 provided that, as already indicated above, the point $F'_o$ has been placed on the almost vertical portion of the curve 10. This results in the possibility of adjusting very precisely the position of $F_o$ on the curve 30. It is easy to see that this would be quite different if one determined the position of the point of operation simply by taking as a basis the value of the bias voltage.

The advantages of the device according to the present invention are evident; first of all, a possibility of working with an approximately constant multiplication factor on a photodiode in the avalanche mode.

The present invention is of interest particularly in connection with laser telemeters whose light detector is generally a photomultiplier tube. It is this tube which may be advantageously replaced by a detector as proposed by the present invention. In this case, the latter will operate in a pulsated system. A sinusoidally modulated energization is preferable in the case where a detector according to the present invention is used for the detection of hyperfrequency Hertzian waves having a low potential. This modulated system is equally desirable in the case where it is necessary to provide for the extinction of the microplasmas in the midst of the semiconductor which constitutes the diode, or also in case the present invention is applied to the guidance or tracking of aircraft, such as military or space rockets, with the aid of a laser.

The detector according to the present invention, aside from having the advantages outlined hereinabove, allows for a detection with an elevated multiplication factor within large intervals of luminous wavelengths for which a photomultiplier tube having a sufficient sensitivity has not previously been available.

We have shown and described an exemplary embodiment in accordance with the present invention. It is understood that the same is not limited thereto but is susceptible of numerous changes and modifications as known to a person skilled in the art and we therefore, do not wish to be limited to the details shown and described herein, but intend to cover all such changes and modifications as are obvious to one of ordinary skill in the art.

We claim:

1. Radiation detector comprising:
   - a photosensitive detector diode biased to operate with avalanche characteristics when it receives the radiation to be detected;
   - a reference diode thermally coupled to said detector diode and having a thermal sensitivity approximately equal to that of said detector diode, said reference diode being effectively isolated from the radiation to be detected;
   - bias voltage means for providing a bias voltage reversely biasing said detector diode; and
   - regulator means responsive to the output of said reference diode for varying said bias voltage applied to said detector diode in a sense appropriate to compensate for variations in output signal due to temperature variations of said detector diode.

2. Detector according to claim 1, wherein the aforementioned regulator means includes a voltage regulator connected between said bias voltage means and said detector diode for controlling the level of said bias voltage and a comparator having a pair of input terminals and furnishing an output signal to said voltage regulator proportional to the voltages being present on the two input terminals thereof, one of said terminals receiving the output signal of said reference diode, and the other terminal being connected to the output of said voltage regulator so as to bring said bias voltage to a value equal to said output signal.

3. Detector according to claim 2, wherein said comparator comprises a differential amplifier.

4. Detector according to claim 1, wherein said reference diode is of the same type as said detector diode and is likewise inversely biased.

5. Detector according to claim 4, wherein said reference diode is connected to said bias voltage means to receive a current essentially independently of temperature and the aforesaid output signal thereof is constituted by the difference in potential between the output of said bias voltage means and ground potential.

6. Detector according to claim 5, wherein said detector diode and said reference diode are connected to ground potential and said reference diode is connected through a variable resistance to the output of said bias voltage means.

7. Detector according to claim 1, wherein said detector diode is connected in series with a modulator to said source of bias voltage.

8. Detector according to claim 1, wherein said detector and reference diodes are formed on the same semiconductor substrate.

9. Detector according to claim 1, wherein the dimensions of said reference diode are greater than those of said detector diode.

10. Radiation detector comprising:

a photosensitive detector diode;

bias voltage means connected to said detector diode to bias said detector diode to operation with avalanche characteristics;

a reference diode thermally coupled to said detector diode and having a thermal sensitivity approximately equal to that of said detector diode, said reference diode being effectively isolated from the radiation to be detected and being connected to the output of said bias voltage means; and regulator means connected between said bias voltage means and said detector diode for varying the operating point of said detector diode in response to variation of the output of said reference diode due to temperature variations.

11. Detector according to claim 10 wherein said detector diode and said reference diode are formed as an integrated element on a common substrate.

12. Detector according to claim 11 wherein the dimensions of said reference diode are greater than those of said detector diode.

13. Detector according to claim 10 wherein said regulator means includes a voltage regulator connected between said bias voltage means and detector diode, and a comparator having a first input connected to the output of said reference diode and a second input connected to the output of said voltage regulator, the output of said comparator being connected in control of said voltage regulator.

14. Detector according to claim 13 wherein said reference diode is connected through a variable resistance directly to the output of said bias voltage means.

15. Detector according to claim 10 wherein a modulator is connected between said regulator means and said detector diode.